US012554296B2

(12) United States Patent
Lin et al.

(10) Patent No.: US 12,554,296 B2
(45) Date of Patent: Feb. 17, 2026

(54) INFORMATION HANDLING SYSTEM RISER CARD HAVING ADAPTABLE HEIGHT AND AIRFLOW

(71) Applicant: Dell Products L.P., Round Rock, TX (US)

(72) Inventors: Kuang-Hsi Lin, Taoyuan (TW); Hung-Wen Wu, New Taipei (TW); Hsin-Yi Hsieh, Changhua (TW)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 18/392,535

(22) Filed: Dec. 21, 2023

(65) Prior Publication Data

US 2025/0208672 A1 Jun. 26, 2025

(51) Int. Cl.
*H05K 7/20* (2006.01)
*G06F 1/185* (2026.01)

(52) U.S. Cl.
CPC ......... *G06F 1/185* (2013.01); *H05K 7/20145* (2013.01)

(58) Field of Classification Search
CPC . G06F 1/185; G06F 1/186; G06F 1/20; G06F 1/184; G06F 2213/0026; G06F 13/409; G06F 2213/0024; H05K 7/20145; H05K 7/20727; H05K 1/14; H05K 1/144; H05K 7/1418; H05K 7/1424; H05K 7/1429; H05K 5/0265

USPC .................................................. 361/679.49
See application file for complete search history.

(56) References Cited

U.S. PATENT DOCUMENTS

| 8,797,764 | B2 | 8/2014 | Bohannon et al. |
| 9,098,252 | B2 | 8/2015 | Sauer et al. |
| 11,429,160 | B2 | 8/2022 | Tseng et al. |
| 2006/0044767 | A1* | 3/2006 | Wu .......... G06F 1/184 361/725 |
| 2012/0020037 | A1* | 1/2012 | Chiu ........ G06F 1/185 361/759 |
| 2013/0088831 | A1* | 4/2013 | Zheng ......... H05K 7/1422 361/679.43 |
| 2013/0265713 | A1* | 10/2013 | Crane ............. G06F 1/185 361/679.51 |
| 2021/0062486 | A1 | 3/2021 | Gilde et al. |
| 2022/0026965 | A1* | 1/2022 | Chen ............. H05K 7/20145 |
| 2022/0057848 | A1* | 2/2022 | Chang ........... H05K 5/0265 |
| 2022/0114130 | A1* | 4/2022 | Lin ............ G06F 13/4221 |
| 2022/0117111 | A1* | 4/2022 | Tseng .......... G06F 1/186 |
| 2023/0129215 | A1 | 4/2023 | Hung et al. |
| 2023/0225070 | A1 | 7/2023 | Hung et al. |

* cited by examiner

*Primary Examiner* — Mandeep S Buttar
(74) *Attorney, Agent, or Firm* — Zagorin Cave LLP; Robert W. Holland (57) ABSTRACT

An information handling system processes information with support from processing components disposed on a riser card coupled to a riser card cage and interfaced with the system processor. A guide coupled to the riser card cage slides relative to a riser card slot to adjust the riser card cage to accept riser cards of different dimensions. An airflow guide coupled to the guide adjusts based on the riser card dimension to direct cooling airflow in an efficient manner at the riser card processing components.

17 Claims, 7 Drawing Sheets

INFORMATION HANDLING SYSTEM RISER CARD HAVING ADAPTABLE HEIGHT AND AIRFLOW

BACKGROUND OF THE INVENTION

Field of the Invention

The present invention relates in general to the field of information handling systems, and more particularly to an information handling system riser card having adaptable height and airflow.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems having processing components that cooperate to process information. For example, a typical information handling system housing has a motherboard with integrated wirelines that communicate information between one or more central processing units (CPUs), memory and other components, such as network interface controllers (NICs), solid state drives (SSDs) and graphics processing units (GPUs). In some instances, processing components are supported through riser cards and/or serial bus cables. As an example, a Peripheral Component Interconnect Express (PCI Express) card slot is included in the motherboard to accept a riser card or cable connector that interfaces the motherboard with additional components supported by the PCI Express standard interface, such as graphics cards, sound cards, hard disk drive host adapters, SSDs, Wi-Fi, and Ethernet hardware connections. PCI Express cards offer end users increased flexibility for the type of components and processing capability included in an information handling system. Often desktop and other stationary information handling system configurations include riser card expansion slots that can accept PCI Express riser cards to adapt the system to desired functionalities. The PCI Express riser cards typically screw into coupling locations at a motherboard or a riser module that couples to the motherboard through a cable connection.

One difficulty with including riser cards in an information handling system housing is that the information handling system has to include the infrastructure to meet the riser card power and thermal constraints. Riser card alignment typically adapts to cooling airflow within the housing by alignment of the components of the riser card with the airflow provided by a cooling fan. Thermal rejection through the airflow can depend on a number of factors. For example, the number of riser cards installed at the information handling system can impact how air flows across the processing components on the riser cards versus unpopulated riser card slots. Another factor is the type of riser card installed. Full height (FH) riser cards used in larger information handling systems have a larger footprint than low profile (LP) riser cards that are used in smaller information handling systems. When an end user installs a LP riser card in a FH riser card slot, cooling airflow can bypass the riser card processing components resulting in inefficient heat transfer. Typically, an end user must block the escape route left for cooling airflow past the smaller footprint PCI Express card, such as with a plastic block that couples to the housing in the open space. When a blocking part is not available or an end user forgets to insert the blocking part, thermal exchange becomes less efficient, which can lead to components overheating or operating on a throttled basis.

SUMMARY OF THE INVENTION

Therefore, a need has arisen for a system and method which adapts a riser card to riser cages of different dimensions when coupled to an information handling system riser card slot.

In accordance with the present invention, a system and method are provided which substantially reduce the disadvantages and problems associated with previous methods and systems for coupling a riser card in an information handling system. A riser card cage slides a guide along an axis perpendicular to a riser card slot to adapt to riser cards of different dimensions. An airflow guide couples to the guide to guide cooling airflow to the riser card processing components based upon the riser card dimensions.

More specifically, an information handling system housing includes a motherboard that interfaces a processor and memory to cooperatively process information. One or more PCI Express riser card slots interface with the motherboard and accept a PCI Express riser card to perform desired functions, such as graphics, sound, network communications and storage. A riser card cage coupled to the housing at the riser card slot accepts riser cards with different dimensions, such as full height or low profile dimension. A guide slides in guide rails of the riser card cage to adjust the riser card cage to accept riser cards of the different dimensions. An airflow guide couples to the guide and flexes based upon the guide position so that cooling airflow passing across the riser card is directed efficiently over the riser card processing components. The airflow guide further adjusts its shape to optimize the airflow adjustments, such as by moving a pin in a slot of the airflow guide and fixing the pin at a desired airflow guide bend.

The present invention provides a number of important technical advantages. One example of an important technical advantage is that an information handling system configured to accept riser cards of a full height dimension will also accept riser cards of a low profile dimension while maintaining efficient cooling airflow. The airflow guide automatically adjusts to direct airflow in an efficient manner based upon the dimensions of the riser card inserted in a riser card cage and remains connected to the riser card cage and ready to adjust whether or not a riser card of any dimension is coupled in the riser card cage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system riser card cage adapts to accept riser cards of different dimensions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
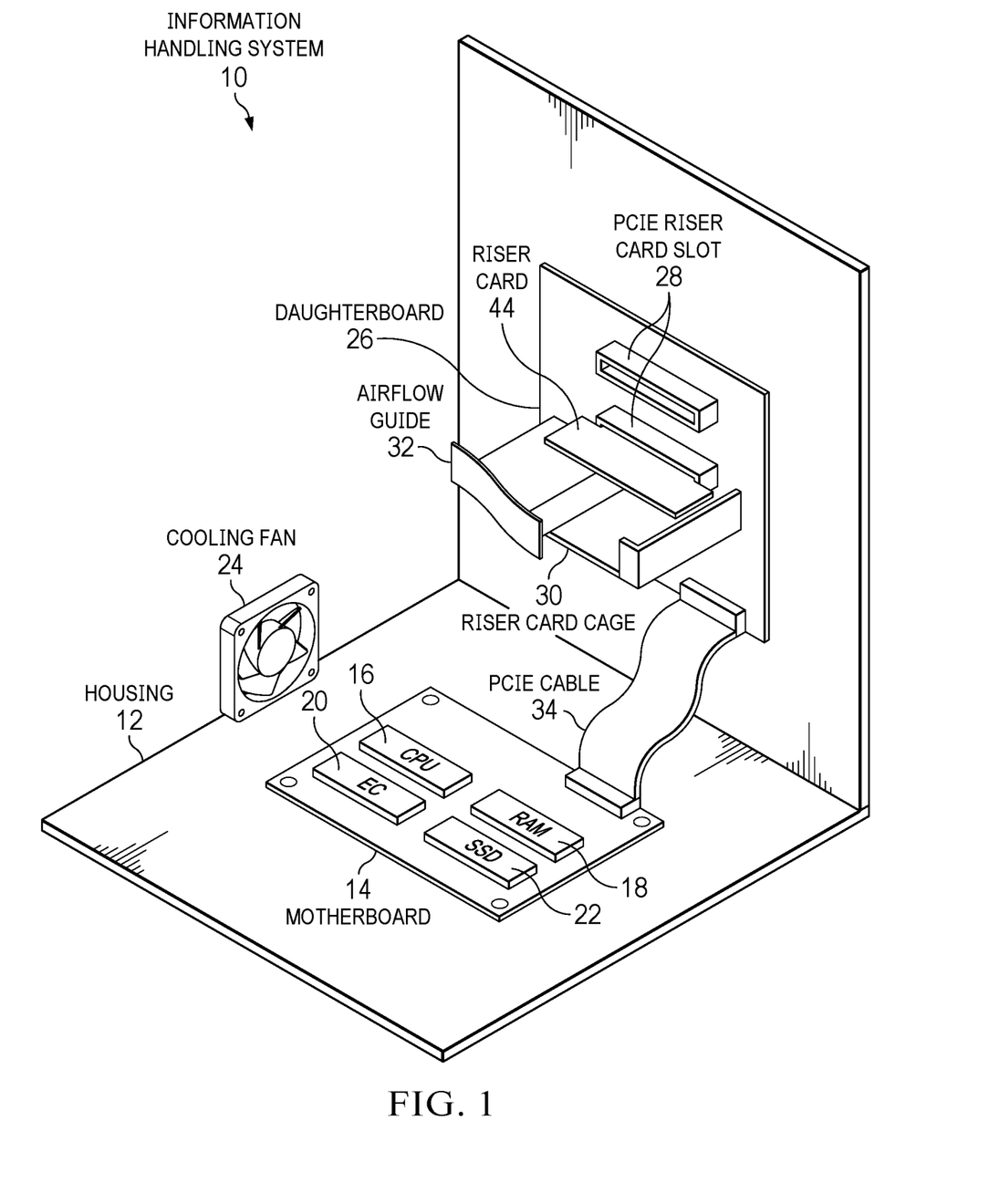
FIG. 1 depicts an upper perspective view of an information handling system having a riser card cage that adapts to accept riser cards of different dimensions.

Referring now to FIG. 1, an upper perspective view depicts an information handling system 10 having a riser card cage 30 that adapts to accept riser cards 44 of different dimensions. In the example embodiment, information handling system 10 has a stationary configuration built into a housing 12, such as desktop configuration; however, in alternative embodiments other types of configurations may be used, such as a portable configuration. A motherboard 14 couples in housing 12 and interfaces processing components that cooperate to process information, such as a central processing unit (CPU) 16 that processes information by executing instructions and a random access memory (RAM) 18 that stores the information and instructions. An embedded controller 20 manages operations of the system at a physical level, such as power and thermals. A solid state drive (SSD) 22 provides persistent storage, such as storing an operating system and applications that execute on CPU 16. In the example embodiment, motherboard 14 interfaces with a daughter board 26 through a cable 34 to provide support for additional functions by coupling riser cards 44 to riser card slots 28 and interfacing through cable 34 with motherboard 14. For instance, riser card slots 28 are PCI Express slots that accept a PCI Express connector of riser cards 44. In alternative embodiments, the riser card slots may extend from motherboard 14 or couple to housing 12. A riser card cage 30 couples riser card 44 in place at riser card slot 28 and directs cooling airflow generated by a cooling fan 24 across the riser card processing components with an airflow guide 32 as is described in greater detail below. In various embodiments, riser card 44 includes processing components to support a variety of functions, such as graphics cards, sound cards, hard disk drive host adapters, SSDs, Wi-Fi, and Ethernet hardware connections.

Figure 2:
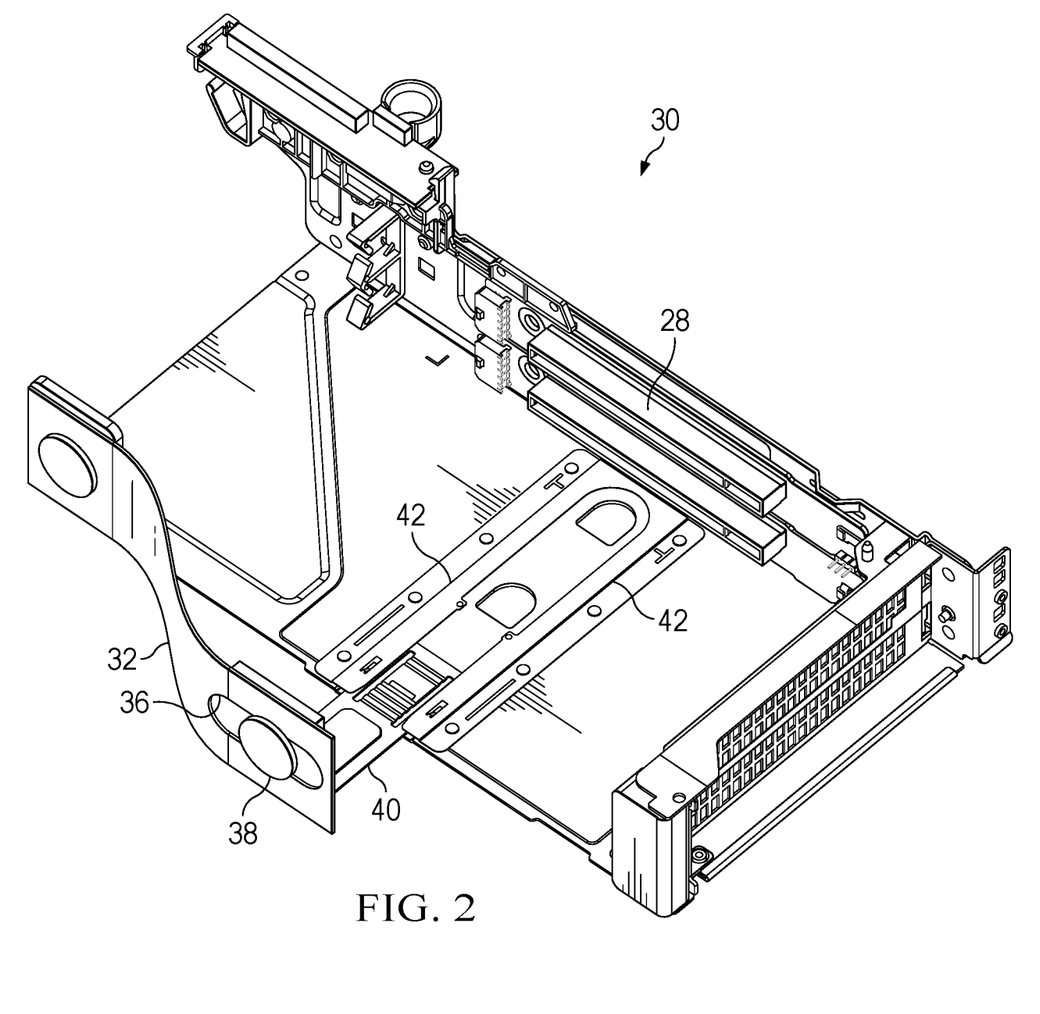
FIG. 2 depicts an upper perspective view of a riser card cage having an airflow guide positioned to accept a riser card that couples to a riser card slot.

Referring now to FIG. 2, an upper perspective view depicts riser card cage 30 having airflow guide 32 positioned to accept a riser card that couples to riser card slot 28. Riser card cage 30 is formed plastic or metal configured to couple to a housing, a daughterboard and/or motherboard, and to accept a riser card of various dimensions. A set of parallel guide rails 42 formed in the base of riser card cage 30 extend from riser card slot 28 in a perpendicular alignment to a side of the base and slidingly couple with a guide 40. Airflow guide 32 couples to riser card cage 30 at a first end and to guide 40 at a second opposite end. Airflow guide 32 couples to guide 40 with a slot 36 and pin 38 arrangement so that the length of airflow guide 32 adjusts based upon the sliding position of guide 40 in guide rails 42. Airflow guide 32 is an elastic piece, such as plastic or stainless steel, that defines an airflow channel within riser card cage 30 to direct airflow over the riser card when it is installed.

Figure 3:
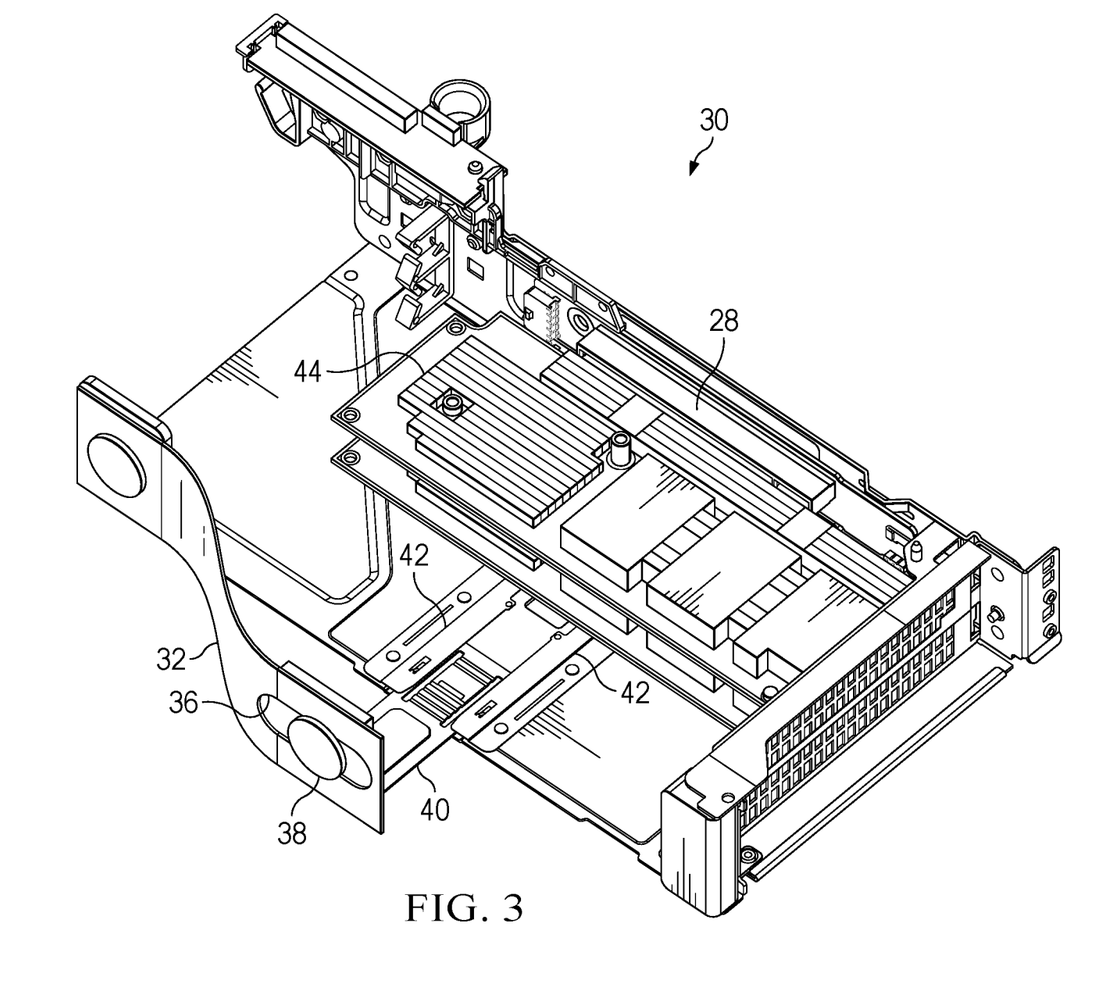
FIG. 3 depicts an upper perspective view of a riser card cage having a low profile riser card positioned to be secured by the guide.

Referring now to FIG. 3, an upper perspective view depicts a riser card cage having a low profile riser card 44 positioned to be secured by guide 40. Riser card 44 has a low profile dimension, such as sized to fit in an information handling system housing having a reduced height. Riser card 44 slides on the base of riser card cage 30 to engage with riser card slot 28, such as with standard PCI Express interface. Once coupled to riser card slot 28, riser card 44 is held in position by the slot and connector interaction and the support of riser card cage 30. Guide 40 is positioned to slide inward on guide rails 42 to press against riser card 44, thereby securing it in position.

Figure 4:
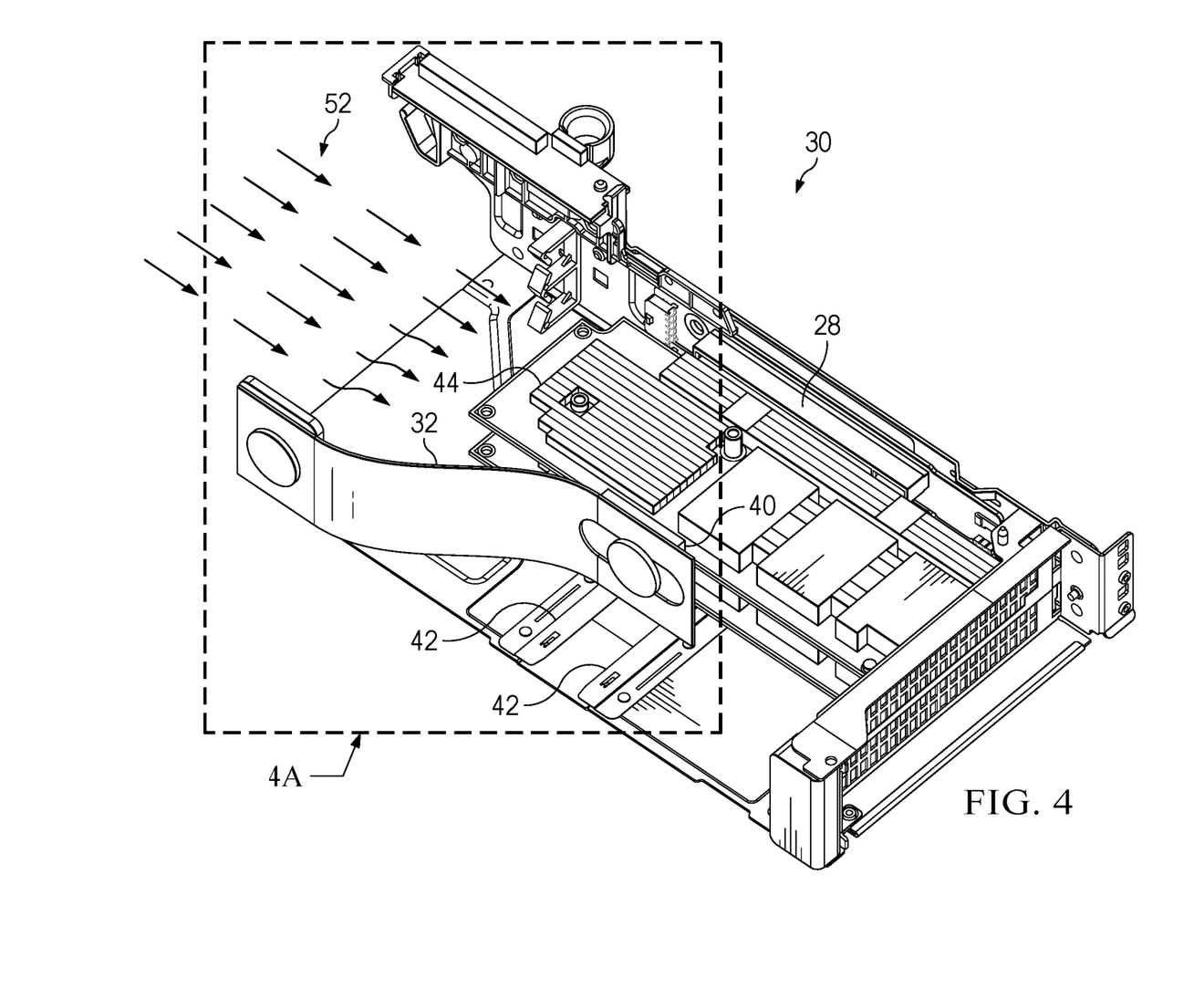
FIGS. 4 and 4A depict an upper perspective view of a riser card cage having the riser card secured in position by the guide to direct airflow at the riser card processing components.
Figure 4A:
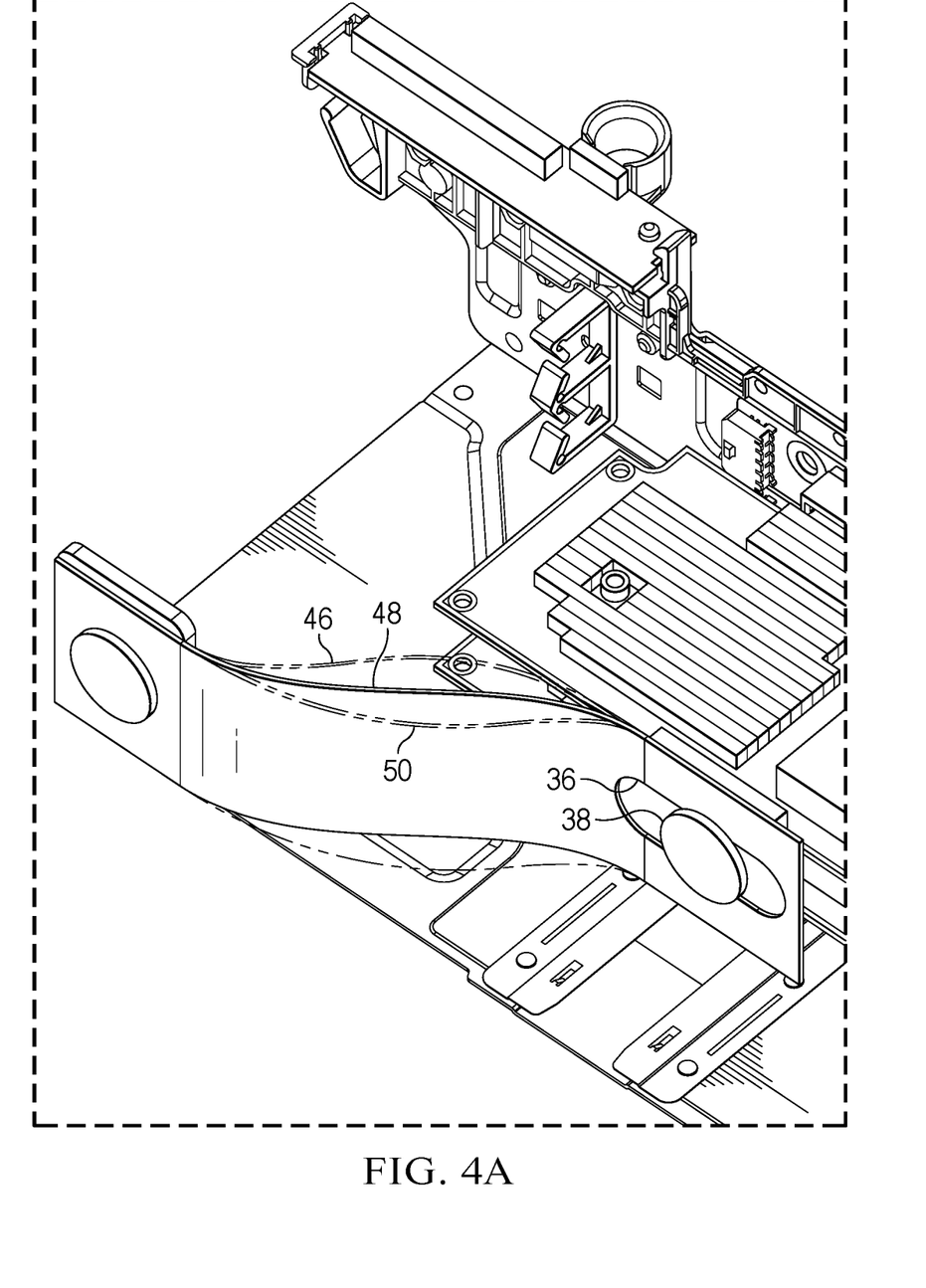

Referring now to FIGS. 4 and 4A, an upper perspective view depicts a riser card cage 30 having the riser card 44 secured in position by the guide 40 to direct airflow at the riser card processing components. In the example embodiment, riser card 44 is a graphics processing unit (GPU) card have PCI Express interfaces couple through riser card slot 28, such as to support graphics ports at the external side of the information handling system housing on the right side of riser card cage 30. Guide 40 has slid inward to a securing position on guide rails 42 to press against riser card 44. Airflow guide 32 is bent inward to channel airflow 52 from a cooling fan to flow over the riser card processing components. In one example embodiment, guide 40 may secure in position with a screw or other coupling device to prevent removal of riser card 44. FIG. 4A depicts that airflow guide 32 can bend to a first position 46, second position 48 and third position 50 that each has different airflow characteristics. For example, airflow guide 32 changes the bend by loosening pin 38, sliding slot 36 relative to the pin, and then retightening pin 38 to hold the desired bend. In alternative embodiments, other types of materials may be used to hold the bend, such as plastic or rubber material that holds a set position.

Figure 5:
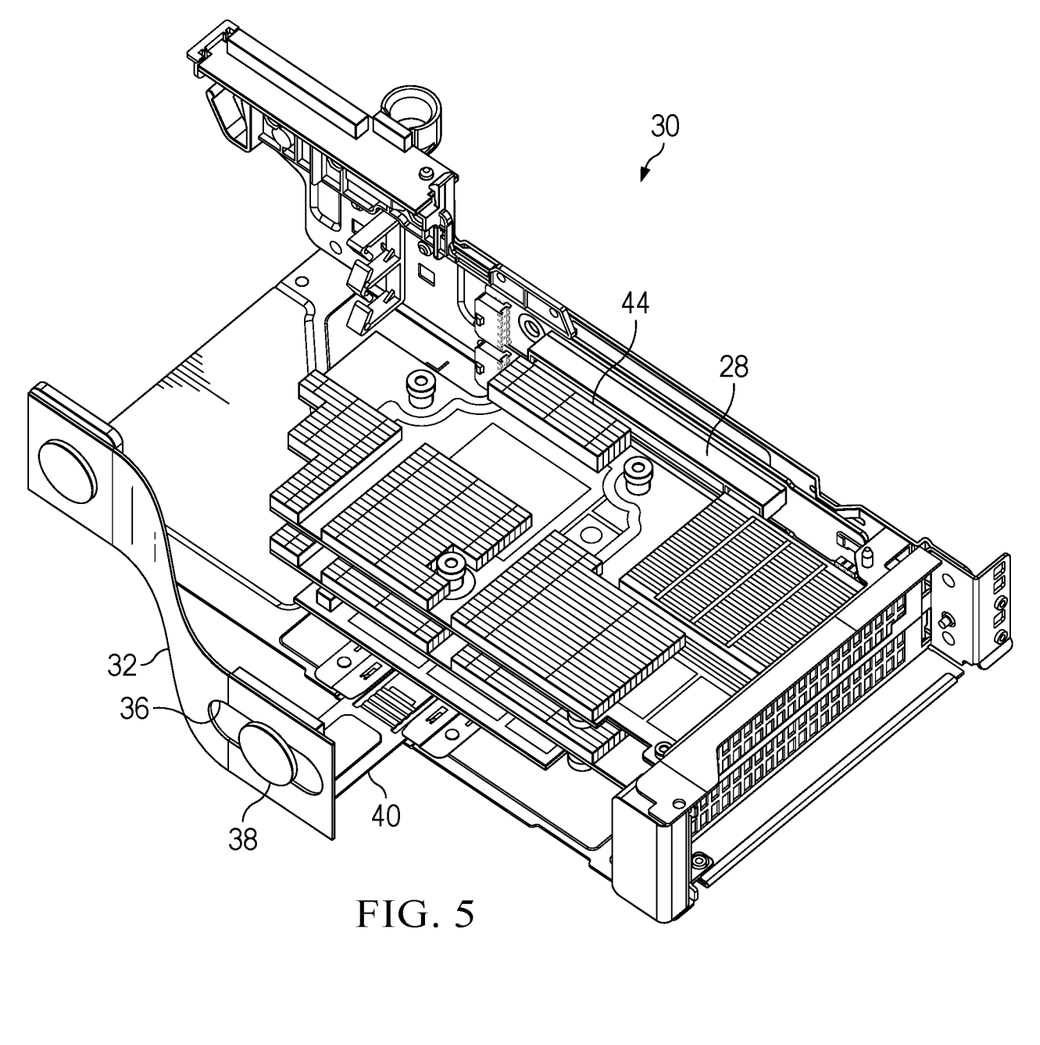
FIG. 5 depicts an upper perspective view of a riser card cage having a full height riser card positioned to be secured by the guide.

Referring now to FIG. 5, an upper perspective view depicts a riser card cage 30 having a full height riser card 44 positioned to be secured by guide 40. The full height riser card dimension is twice the length of the low profile riser card dimension along the axis defined by guide rails 42. Guide 40 extends out past the side of riser card cage 30 to provide space for riser card 44 to slide into and couple with slot 28. Airflow guide 32 extends out in a flexible manner as with the low profile riser card sliding pin 38 within slot 36.

Figure 6:
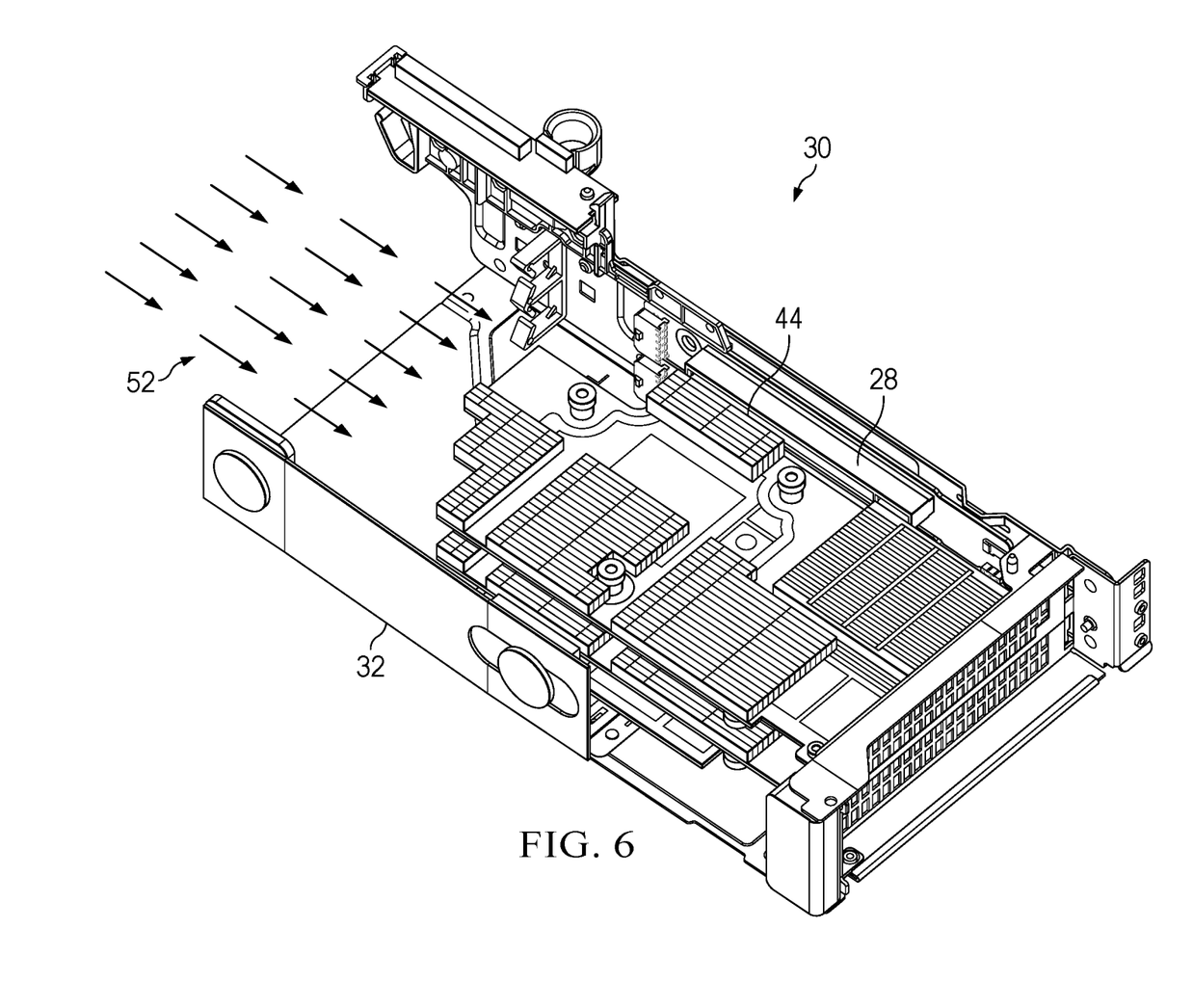
FIG. 6 depicts an upper perspective view of a riser card cage having the riser card secured in position by the guide to direct airflow at the riser card processing components.

Referring now to FIG. 6, an upper perspective view depicts a riser card cage 30 having the riser card 44 secured in position by the guide 40 to direct airflow 52 at the riser card processing components. The same configuration of riser card cage 30 fits both sizes of riser cards with cooling airflow adjusted by the position of the airflow guide as appropriate. Although the example embodiment depicts PCI Express riser card installation of full height and low profile riser cards, alternative embodiments may support riser cards with different dimensions and different interface standards.

Although the present invention has been described in detail, it should be understood that various changes, substitutions and alterations can be made hereto without departing from the spirit and scope of the invention as defined by the appended claims.

What is claimed is:

1. An information handling system comprising: a housing; a motherboard coupled to the housing; a processor coupled to the motherboard and operable to execute instructions to process information; a memory coupled to the motherboard and operable to store the instructions and the information; a riser card slot interfaced with the motherboard and configured to couple with a riser card; and a riser card cage aligned with the riser card slot to couple a riser card in the riser card slot, the riser card cage having guide rails extending perpendicular from the riser card slot, a guide coupled to slide in the guide rails and an airflow guide coupled at a first end to the riser card cage and coupled at a second end to the guide, the guide sliding on the guide rails to change a shape of the airflow guide; and wherein the airflow guide has a slot at the second end; and the airflow guide couples to the guide with a pin through the airflow guide slot at plural locations, each of the plural locations adjusting the shape of the airflow guide.

2. The information handling system of claim 1 further comprising:
   a riser card coupled to the riser card slot in the riser card cage;
   wherein the guide slides in the guide rails to press against the riser card.

3. The information handling system of claim 2 wherein the airflow guide comprises an elastic material that bends to guide airflow towards the riser card.

4. The information handling system of claim 1, wherein the riser card and riser card slot interface with a PCI Express connection.

5. The information handling system of claim 4 wherein the riser card comprises a graphics processing unit.

6. The information handling system of claim 4 wherein the riser card comprises a network interface controller.

7. The information handling system of claim 4 wherein the guide slides to a first position associated with a full height riser card and a second position associated with a low profile riser card.

8. The information handling system of claim 4 further comprising a cooling fan aligned to blow cooling airflow across the riser card cage parallel to the riser card slot.

9. A method for coupling a riser card in an information handling system, the method comprising: inserting the riser card into a riser card slot of a riser card cage; sliding a guide in guide rails of the riser card cage and against the riser card; and defining a cooling airflow channel in the riser card cage with an airflow guide coupled to the riser card cage and the guide; and further comprising coupling a pin through a slot of the airflow guide and to the guide; and sliding the airflow guide relative to the pin in the slot to adjust a curvature of the airflow guide.

10. The method of claim 9, further comprising: sliding the guide in the guide rails to a low profile position having a first airflow guide curvature; and sliding the guide in the guide rails to a full height profile having a second airflow guide curvature.

11. The method of claim 10 wherein the riser card and riser card slot interface with a PCI Express connection.

12. The method of claim 11 wherein the riser card comprises a graphics processing unit.

13. The method of claim 11 wherein the riser card comprises a network interface controller.

14. The method of claim 11 further blowing cooling airflow through the airflow channel with a cooling fan.

15. A riser card system comprising: a riser card slot operable to interface with an information handling system motherboard and configured to couple with a riser card; and a riser card cage aligned with the riser card slot to couple a riser card in the riser card slot, the riser card cage having guide rails extending perpendicular from the riser card slot, a guide coupled to slide in the guide rails and an airflow guide coupled at a first end to the riser card cage and coupled at a second end to the guide, the guide sliding on the guide rails to change a shape of the airflow guide; and wherein the airflow guide has a slot at the second end; and the airflow guide couples to the guide with a pin through the airflow guide slot at plural locations, each of the plural locations adjusting the shape of the airflow guide.

16. The riser card system of claim 15 further comprising:
   a riser card coupled to the riser card slot in the riser card cage;
   wherein the guide slides in the guide rails to press against the riser card.

17. The riser card system of claim 15, wherein the guide slides to a first position associated with a full height riser card and a second position associated with a low profile riser card.

* * * * *